INVENTORS
CARL D. PETERSON
ROBERT R. BURKHALTER
BY Bodell & Thompson
ATTORNEYS

Aug. 16, 1949.        C. D. PETERSON ET AL        2,479,184
SYNCHRONIZING CLUTCH CONSTRUCTION
Filed Jan. 19, 1946        2 Sheets-Sheet 2

INVENTORS
CARL D. PETERSON
BY ROBERT R. BURKHALTER

Bodell & Thompson
ATTORNEYS

Patented Aug. 16, 1949

2,479,184

UNITED STATES PATENT OFFICE 2,479,184

SYNCHRONIZING CLUTCH CONSTRUCTION

Carl D. Peterson and Robert R. Burkhalter, Toledo, Ohio, assignors to Dana Corporation, Toledo, Ohio, a corporation of Virginia Application January 19, 1946, Serial No. 642,169

2 Claims. (Cl. 192—53)

This invention relates to synchronizing clutches and has for its object an economical and compact construction and assembly of the friction and jaw or toothed sections and the yielding connection between them of the shiftable clutch member, which connection permits one of the sections, usually the toothed or jaw section, to be shifted relatively to the other or friction section, when the friction or synchronizing section has been stopped in its shifting-in movement, effected by shifting-in force applied to the toothed element. It further has for its object the construction of the yielding coupling means between the two sections.

The invention consists in the novel features and in the combinations and constructions hereinafter set forth and claimed.

In describing this invention, reference is had to the accompanying drawings in which like characters designate corresponding parts in all the views.

Figure 1:
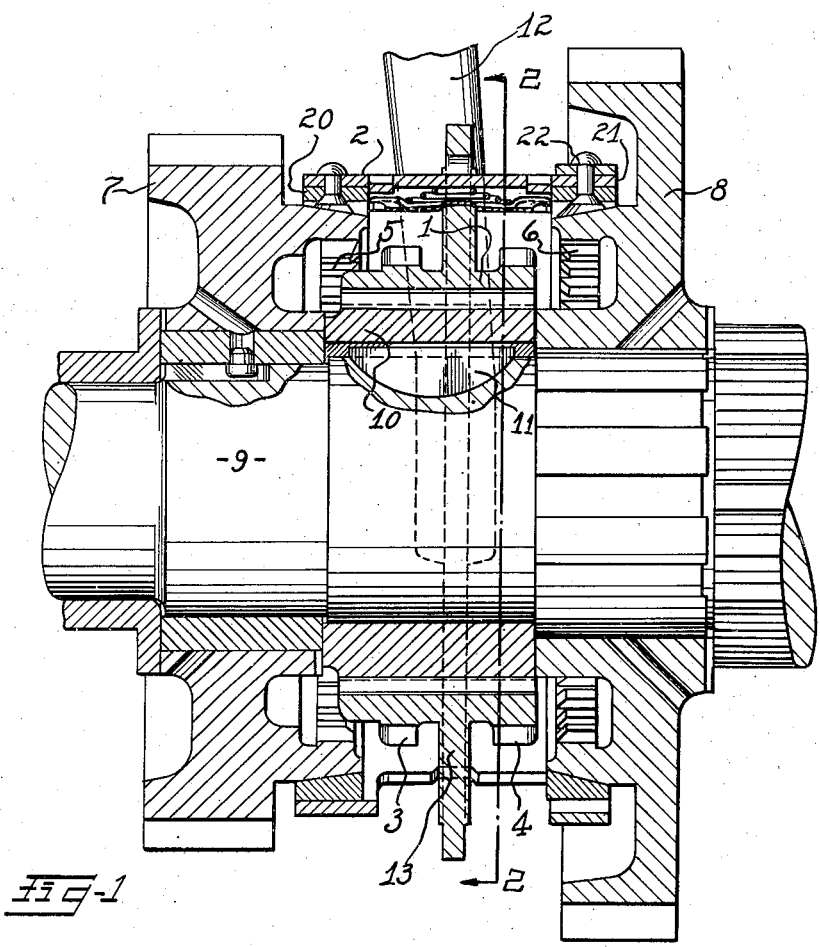
Figure 1 is a longitudinal sectional view of this synchronizing clutch, the contiguous portions of the transmission gearing in which it is installed being also shown.
Figures 4, 5:
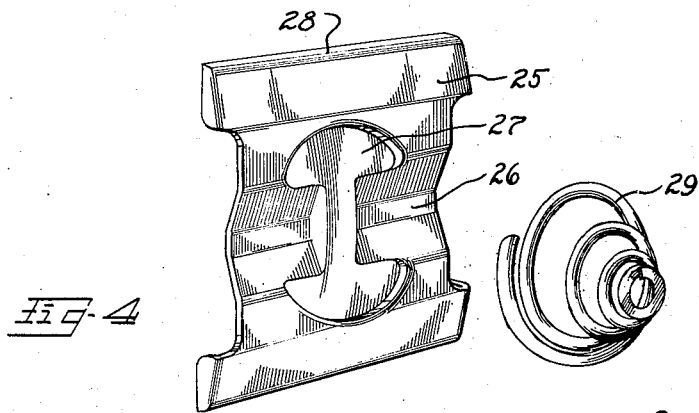
Figure 4 is an isometric view of one of the spring abutments of the yielding connection between the friction and toothed sections.
Figure 5 is an isometric view of one of the conical coil springs of such connections.

This synchronizing clutch is of the double type shiftable in opposite directions from neutral and including jaw or toothed and friction or synchronizing sections, the jaw section having sets of jaw teeth on opposite ends thereof, and the friction section having friction faces at opposite ends thereof. The shifting force is applied to one section, as the jaw section, and transmitted to the other or friction section through yielding means, which causes the two sections to shift first as a unit in either direction from neutral, until the friction section coacts with a complemental friction face and is thus stopped from shifting movement, and during continued shifting-in force the yielding coupling means yields permitting the toothed section to be shifted into clutching engagement. The engagement of the friction section with a coacting friction section effects synchronization of two rotating parts to be clutched together, by the jaw section.

The yielding coupling means between the two sections has heretofore been spring-pressed poppets. The yielding coupling of this invention eliminates the machine work required in the poppet type and includes a spring abutment and a conical spring both readily assembled with the toothed and jaw clutch sections.

I designates the toothed section of this synchronizing clutch member and 2 the friction section thereof. The toothed section has sets of clutch teeth 3, 4 at its opposite ends for coacting with complemental toothed clutch faces 5, 6, on motion transmitting members as gears 7, 8 rotatably mounted on a transmission shaft 9 of a gearing and arranged to be alternately clutched thereto, the gears 7, 8 being arranged in different gear trains, as will be understood. The toothed clutch section I is here shown as slidably splined on a collar 10 which is keyed at 11 to the shaft 9 between the gears 7, 8. The shifting-in force is applied to the toothed clutch section I by a suitable shifting lever 12, and as here shown, the section I is formed with a radially extending annular flange 13 with which the fork of the shift lever coacts. The flange 13 is formed with arcuate slots 14 for a purpose to be hereinafter explained.

Figure 3:
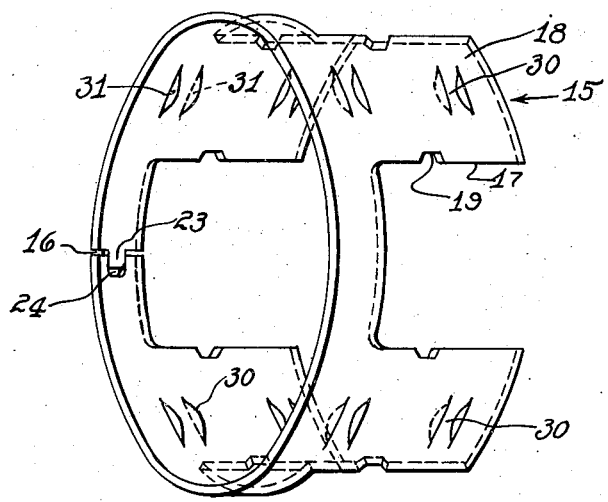
Figure 3 is a detail perspective view of the cylindrical sheet metal body of the friction section.

The outer or friction section 2 is in the form of a sleeve (see Figure 3) formed up out of a strip 15 of sheet metal, so that the sleeve is split, as at 16. The sleeve is formed with slots 17 extending inwardly from one end thereof and terminating short of the other, the slots providing prongs 18 which, when the clutch is assembled, extend through the slots 14 in the annular flange 13 of the toothed clutch member I. The side walls of the slots 17 or side edges of the prongs 18 are provided with notches 19 which coact with the end edges of webs between the ends of the slots 14, to have a blocking action, until the speeds of the two parts to be clutched together synchronize, as will be understood by those skilled in the art. It is thought sufficient to mention that normally one end edge of each web is in one of the notches 19 at one side of each slot 17, and that when the speeds approach synchronization and the shifting-in force applied to the shift lever is sufficient, the webs cam out of notches rotating or rocking the friction section or the toothed section slightly so that the webs can aline and slide along the slots 17 causing one set or the other of the clutch teeth 3 or 4 to engage with the other set 5 or 6. The friction section includes internal friction rings 20 and 21 at opposite ends thereof and riveted thereto and the end of the sleeve 15 through which the slots 17 open is further provided with an exterior ring 22. The rings 21 and 22 at the right hand end of the sleeve close the open ends of the slots 17. The abutting ends of the split sleeve 15 are shown as provided with an interfitting tongue 23 and a notch 24 respectively, which initially locate and hold these two ends in alinement prior to the time the rings 20, 21 and 22 are assembled with the sleeve.

Figure 2:
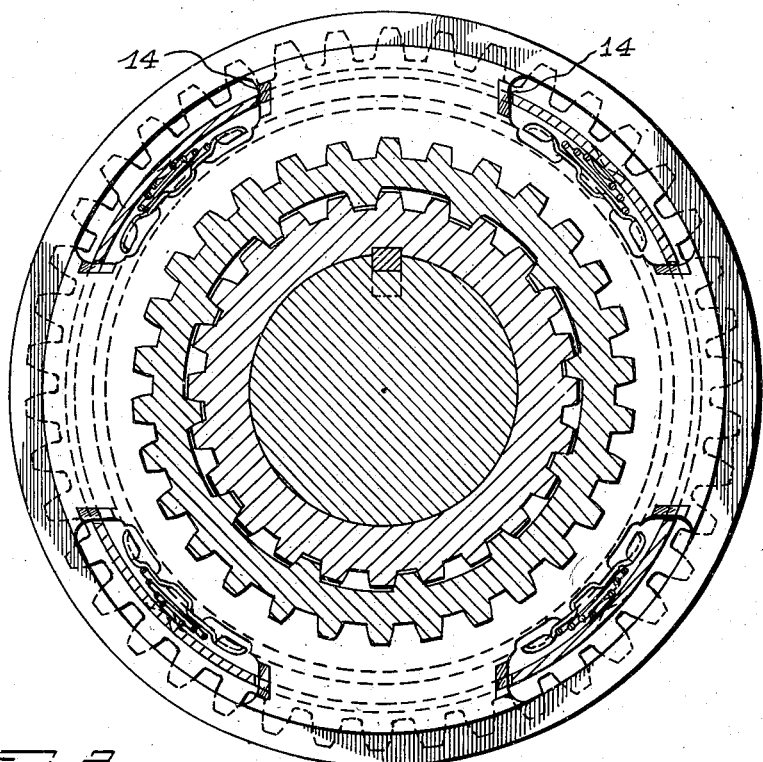
Figure 2 is a sectional view taken on the plane of line 2—2, Figure 1.

25 designates the spring abutments. Each spring abutment is a rigid plate, usually a stamping, each plate being formed with a cam-shaped groove 26 extending lengthwise thereof with respect to the axis of the clutch or shaft 9, this groove coacting with or seating on the bottom wall of each of the slots 14, as shown in Figure 2, and the side walls of the groove or the bottom wall, or both, being beveled so that the spring abutments and the bottom walls of the slots 14 coact with a cam action. Each abutment is also formed with a spring seat 27 and the end portions 28 of each abutment thrust against the inner faces of the friction rings 20 and 21 to hold the abutments from axial displacement relative to the outer or friction section. 29 designates coiled conical springs, each spring seating at its larger end in the seat 27 of the abutment 25 and at its smaller or apex end thrusting against the inner face of the sleeve 15 or the inner face of each of the prongs 17. Each abutment obviously will, during shifting-in movement of the jaw element 1, have a radial shifting movement toward the inner face of each of the contiguous prongs 17. Shoulders or stops 30 are provided on the inner faces of the prongs to take the thrust of the friction rings 20 and 21. These shoulders may be formed by striking or distorting inwardly portions of the stock of the sleeve 5 between circumferentially extending parallel slits 31.

During the starting portion of the shifting-in of the clutch member in either direction from neutral, the two sections 1, 2 shift as a unit by reason of the cam engagement between the flange 13 of the toothed section 1 and the spring abutments 25. After one or the other of the friction rings 20 or 21 engage with a complemental friction ring on the gear 7 or 8 and the speeds of the two parts 7 or 8 and that of the shaft 9 synchronize, the webs between the slots 14 can, on the application of sufficient shifting-in force, dislodge from the cam-shaped notches 19, so that complete shifting-in of the toothed section 1 is effected, and in so doing, the web portions of the annular flange 13 dislodge from the grooves 26 of the abutments.

By reason of the spring abutment and conical springs with the sleeve 15, the clutch is particularly economical in manufacture and assembly and compact in construction.

What we claim is:

1. In a double synchronizing clutch including a member shiftable axially in opposite directions from neutral, and having an inner toothed section, to which the shifting force is applied, and an outer friction section, the inner section having a radial peripheral flange to which the shifting force is applied formed with openings and the outer section having prongs extending through the openings, and means for frictionally holding the sections so that they shift as a unit in either direction until the shifting of the outer section is stopped, and further shifting force causes the inner section to shift relative to the outer section; said friction holding means embodying spring abutments, each extending through one of said openings and having a groove for coacting cam fashion with the inner wall of said opening, springs interposed between the abutments and the inner sides of said prongs, the abutments coacting with the outer section to hold the abutments from displacement, the outer section including a cylindrical sheet metal sleeve cut away to provide the prongs, and friction rings at the opposite ends of the sleeve, the sleeve having inwardly extending shoulders located to take the thrust of the friction rings, the ends of each abutment thrusting against the opposing faces of the friction rings, the sleeve being split and the ends thereof being formed with interlocking tongues and notches.

2. In a double synchronizing clutch of the type including a member shiftable axially in opposite directions from neutral and having an inner toothed section to which the shifting-in force is applied and an outer friction section, means by which the application of shifting-in force first shifts the sections as a unit until the friction section engages and thereafter when the speeds of the two parts to be clutched together synchronize, the toothed section shifts relative to the friction section into clutching engagement, the friction section including a split sleeve, the sleeve having interlocking tongues and notches on opposite sides of its split, and friction rings secured to opposite ends of the sleeve.

CARL D. PETERSON.
ROBERT R. BURKHALTER.

REFERENCES CITED

The following references are of record in the file of this patent:

UNITED STATES PATENTS

| Number | Name | Date |
| --- | --- | --- |
| 2,221,893 | White | Nov. 19, 1940 |
| 2,221,894 | White | Nov. 19, 1940 |
| 2,391,268 | Peterson et al. | Dec. 18, 1945 |